United States Patent
Otsuki et al.

(10) Patent No.: US 11,059,180 B2
(45) Date of Patent: Jul. 13, 2021

(54) CONTROL DEVICE AND MACHINE LEARNING DEVICE

(71) Applicant: Fanuc Corporation, Yamanashi (JP)

(72) Inventors: Hideki Otsuki, Minamitsuru-gun (JP); Hiroshi Abe, Minamitsuru-gun (JP)

(73) Assignee: Fanuc Corporation, Yamanashi (JP)

( * ) Notice: Subject to any disclaimer, the term of this patent is extended or adjusted under 35 U.S.C. 154(b) by 283 days.

(21) Appl. No.: 16/267,841

(22) Filed: Feb. 5, 2019

(65) Prior Publication Data
US 2019/0314996 A1 Oct. 17, 2019

(30) Foreign Application Priority Data
Feb. 9, 2018 (JP) .............................. JP2018-022384

(51) Int. Cl.
*G05B 19/04* (2006.01)
*B25J 11/00* (2006.01)
*B25J 9/16* (2006.01)
*G06N 20/00* (2019.01)

(52) U.S. Cl.
CPC ........... *B25J 11/008* (2013.01); *B25J 9/1661* (2013.01); *G06N 20/00* (2019.01)

(58) Field of Classification Search
CPC .................. B25J 11/008; B25J 9/1661; G05B 2219/39295; G05B 2219/40053; G06N 20/00; G06N 3/006; G06N 3/04; G06N 3/08
See application file for complete search history.

(56) References Cited

U.S. PATENT DOCUMENTS

| 6,467,675 | B1 | 10/2002 | Ozaku et al. | |
| 10,254,741 | B2 * | 4/2019 | Wang | B25J 9/163 |
| 10,302,519 | B2 * | 5/2019 | Arai | B25J 13/06 |

(Continued)

FOREIGN PATENT DOCUMENTS

| JP | 08132367 A | 5/1996 |
| JP | 2001-047327 A | 2/2001 |
| JP | 2013151063 A | 8/2013 |

OTHER PUBLICATIONS

Notice of Reasons for Refusal for Japanese Application No. 2018-022384, dated Jan. 21, 2020, with translation, 4 pages.

*Primary Examiner* — Harry Y Oh
(74) *Attorney, Agent, or Firm* — RatnerPrestia (57) ABSTRACT

A machine learning device includes: a state observation unit that observes component arrangement data representing an arrangement of components on a component serving place, component data representing information of the components, and operator status data representing status information of an operator, as state variables representing a current state of an environment; a determination data acquisition unit that acquires product quality determination data for determining quality of the product which is assembled based on an arrangement of the components and takt time determination data for determining takt time for assembly of the product as determination data; and a learning unit that performs learning based on the state variables and the determination data in a manner to associate information of the components used for assembling the product and status information of the operator with respect to an arrangement of the components on the component serving place.

7 Claims, 7 Drawing Sheets

(56) References Cited

U.S. PATENT DOCUMENTS

| | | |
|---|---|---|
| 10,350,749 B2* | 7/2019 | Wang ..................... B25J 9/163 |
| 10,668,619 B2* | 6/2020 | Ueda ....................... B25J 13/06 |
| 2011/0184555 A1 | 7/2011 | Kosuge et al. |
| 2018/0180085 A1* | 6/2018 | Watanabe ........ G05B 19/41805 |
| 2018/0285766 A1* | 10/2018 | Shen .................... G06F 11/302 |
| 2020/0024712 A1* | 1/2020 | Iwamura ............... G06N 3/084 |

* cited by examiner

CONTROL DEVICE AND MACHINE LEARNING DEVICE

CROSS-REFERENCE TO RELATED APPLICATION

This application is a new U.S. Patent Application that claims benefit of Japanese Patent Application No. 2018-022384, filed Feb. 9, 2018, the disclosure of this application is being incorporated herein by reference in its entirety for all purposes.

BACKGROUND OF THE INVENTION

1. Field of the Invention

The present invention relates to a control device and a machine learning device and especially relates to a control device and a machine learning device for a serving robot.

2. Description of the Related Art

A serving robot is a robot that carries components required for assembling a device, for example, out of a component warehouse or the like and serves the components in a collective manner near an operator or an assembly robot that performs an assembly work so that the assembly work is easily performed, in a preceding process of a product assembling process. A serving robot serves each component in a prescribed arrangement which is programmed in advance.

Japanese Patent Application Laid-Open No. 2001-047327, for example, discloses a component supply robot that conveys components which are to be used for assembling a car body to a prescribed position, as a prior art technique related to a serving robot.

A product assembly work is performed by an operator or an assembly robot in a factory environment, but an assembly work in one line is not always performed by a specific operator or assembly robot. It is considered that an optimal component arrangement with respect to a component serving place is changed if an operator or an assembly robot is switched. Further, even when an operator is not switched, performance (a component arrangement which is felt to be optimal) of the operator varies due to fatigue caused by long-time work.

SUMMARY OF THE INVENTION

An object of the present invention is to provide a control device and a machine learning device that are capable of determining an optimal arrangement of components on a component serving place in a product assembly work.

According to an aspect of the present invention, a control device that instructs an arrangement of components on a component serving place, which is performed by a serving robot, includes a machine learning device that learns a component arrangement on the component serving place by the serving robot. The machine learning device includes: a state observation unit that observes component arrangement data representing an arrangement of the components on the component serving place, component data representing information of the components, and operator status data representing status information of an operator who assembles a product with the components, as state variables representing a current state of an environment; a determination data acquisition unit that acquires product quality determination data for determining quality of the product which is assembled based on an arrangement of the components and takt time determination data for determining takt time for assembly of the product as determination data representing a suitability determination result on assembly of the product by the operator; and a learning unit that performs learning based on the state variables and the determination data in a manner to associate information of the components used for assembling the product and status information of the operator with respect to an arrangement of the components on the component serving place.

According to another aspect of the present invention, a control device that instructs an arrangement of components on a component serving place, which is performed by a serving robot, includes a machine learning device that has learned a component arrangement on the component serving place by the serving robot. The machine learning device includes: a state observation unit that observes component arrangement data representing an arrangement of the components on the component serving place, component data representing information of the components, and operator status data representing status information of an operator who assembles a product with the components, as state variables representing a current state of an environment; a learning unit that has performed learning in a manner to associate information of the components used for assembling the product and status information of the operator with respect to an arrangement of the components on the component serving place; and a decision-making unit that determines an arrangement of the components on the component serving place based on state variables observed by the state observation unit and a learning result obtained by the learning unit.

According to still another aspect of the present invention, a machine learning device that learns an arrangement of components on a component serving place, which is performed by a serving robot, includes: a state observation unit that observes component arrangement data representing an arrangement of the components on the component serving place, component data representing information of the components, and operator status data representing status information of an operator who assembles a product with the components, as state variables representing a current state of an environment; a determination data acquisition unit that acquires product quality determination data for determining quality of the product which is assembled based on an arrangement of the components and takt time determination data for determining takt time for assembly of the product as determination data representing a suitability determination result on assembly of the product by the operator; and a learning unit that performs learning based on the state variables and the determination data in a manner to associate information of the components used for assembling the product and status information of the operator with respect to an arrangement of the components on the component serving place.

According to yet another aspect of the present invention, a machine learning device that has learned an arrangement of components on a component serving place, which is performed by a serving robot, includes: a state observation unit that observes component arrangement data representing an arrangement of the components on the component serving place, component data representing information of the components, and operator status data representing status information of an operator who assembles a product with the components, as state variables representing a current state of an environment; a learning unit that has performed learning in a manner to associate information of the components used for assembling the product and status information of the operator with respect to an arrangement of the components on the component serving place; and a decision-making unit that determines an arrangement of the components on the component serving place based on state variables observed by the state observation unit and a learning result obtained by the learning unit.

According to the present invention, assembly components are served in an appropriate arrangement in accordance with an operator's state, realizing shortening of takt time in an assembly work and reduction in load on the operator.

BRIEF DESCRIPTION OF THE DRAWINGS

The above-described and other objects and features of the present invention will be apparent from the following embodiments which are described in reference to the accompanying drawings. Among these drawings.

DETAILED DESCRIPTION OF THE PREFERRED EMBODIMENTS

Embodiments according to the present invention are described below with reference to the accompanying drawings.

Figure 1:
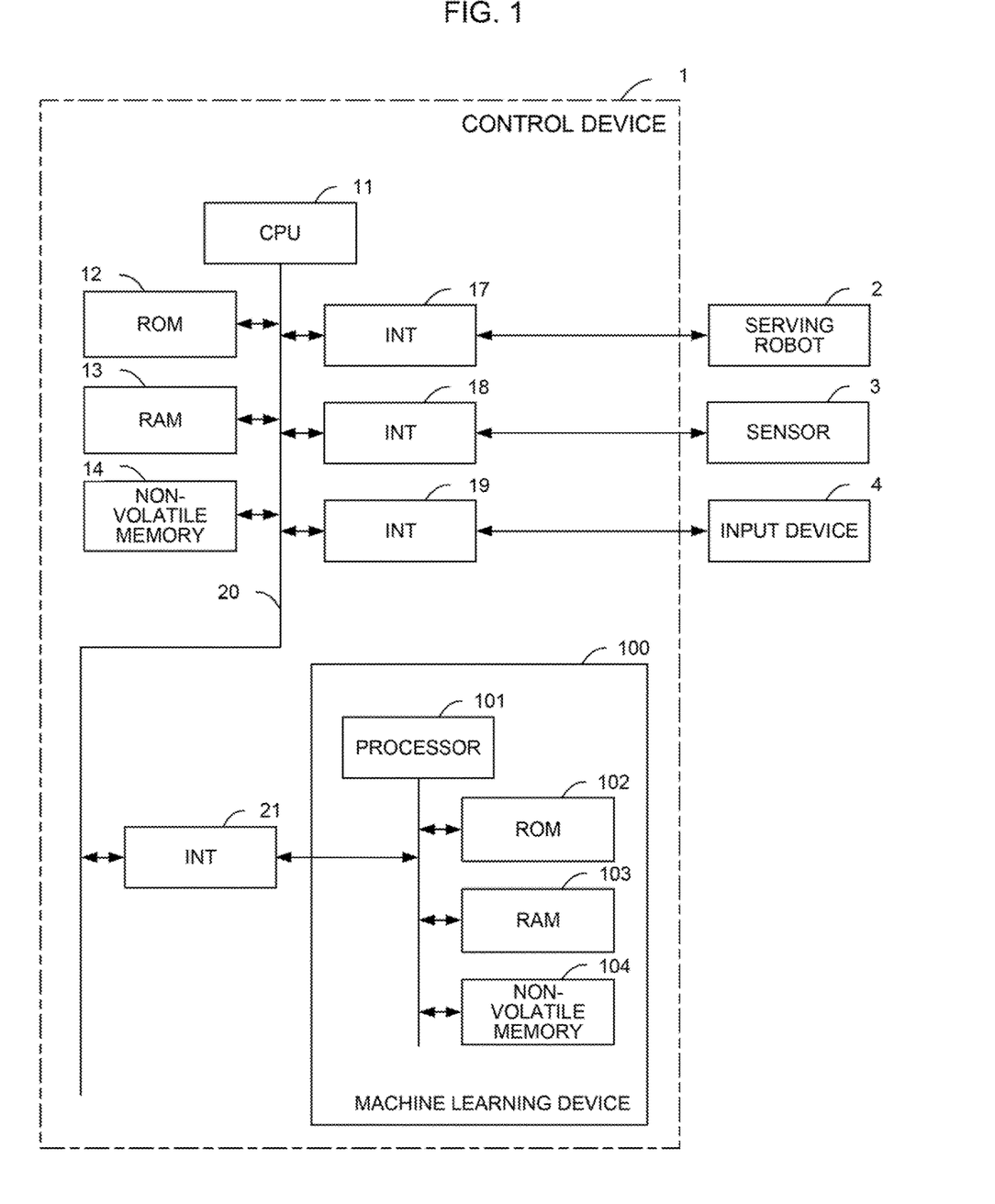
FIG. 1 is a hardware configuration diagram schematically illustrating a control device according to a first embodiment.

FIG. 1 is a hardware configuration diagram schematically illustrating chief parts of a control device according to a first embodiment. A control device 1 can be mounted as a control device for controlling a serving robot, for example. Further, the control device 1 can be mounted as a personal computer juxtaposed with a control device controlling a serving robot 2 and a computer such as a cell computer, a host computer, an edge server, and a cloud server that is connected with the control device via a wired/wireless network, for example. The present embodiment illustrates an example of a case that the control device 1 is mounted as a control device controlling the serving robot 2.

A CPU 11 included in the control device 1 according to the present embodiment is a processor for entirely controlling the control device 1. The CPU 11 reads out a system program stored in a ROM 12 via a bus 20 and controls the whole of the control device 1 in accordance with the system program. A RAM 13 temporarily stores temporary calculation data and display data and various kinds of data which are inputted by an operator via an input unit, which is not shown, for example.

A non-volatile memory 14 is backed up by a battery, which is not shown, for example, and thus, the non-volatile memory 14 is configured as a memory whose storage state is maintained even when the control device 1 is turned off. The non-volatile memory 14 stores programs and data which are read from the outside and various kinds of data which are acquired from each unit of the control device 1, the serving robot 2, a sensor 3, and an input device 4 (a position of the serving robot, a component arrangement on a component serving place, a motion of an operator, quality information of a product, and a status of the operator, for example). The programs and various kinds of data stored in the non-volatile memory 14 may be developed on the RAM 13 when the programs and the various kinds of data are executed/used. Further, various kinds of system programs such as a known analysis program (including a system program for controlling exchange with a machine learning device 100 described later) are preliminarily written in the ROM 12.

The serving robot 2 is connected with the control device 1 via an interface 17 and operates based on a command issued from the control device 1. The control device 1 acquires each data related to the operation of the serving robot 2 via the interface 17.

Further, the control device 1 acquires detection values detected by the sensor 3 via an interface 18. A plurality of sensors 3 are connected to the control device 1 as appropriate. Examples of the sensor 3 include an imaging device for imaging a serving place of components and a motion of an operator, for example.

An interface 19 receives an input from the input device 4 such as a key board and a pointing device and transfers the inputted data to the CPU 11. Quality information of a product assembled by an operator and a status of the operator, for example, are inputted from the input device 4.

An interface 21 is an interface for connecting the control device 1 with the machine learning device 100. The machine learning device 100 includes a processor 101 that entirely controls the machine learning device 100, a ROM 102 that stores system programs and the like, a RAM 103 that performs temporary storage in each processing related to machine learning, and a non-volatile memory 104 that is used for storing learning models and the like. The machine learning device 100 is capable of observing various information (a position of the serving robot, a component arrangement on a component serving place, a motion of an operator, quality information of a product, and a status of the operator, for example) which can be acquired by the control device 1 via the interface 21. Further, the control device 1 controls the operation of the serving robot 2 in accordance with a component arrangement on a component serving place outputted from the machine learning device 100.

Figure 2:
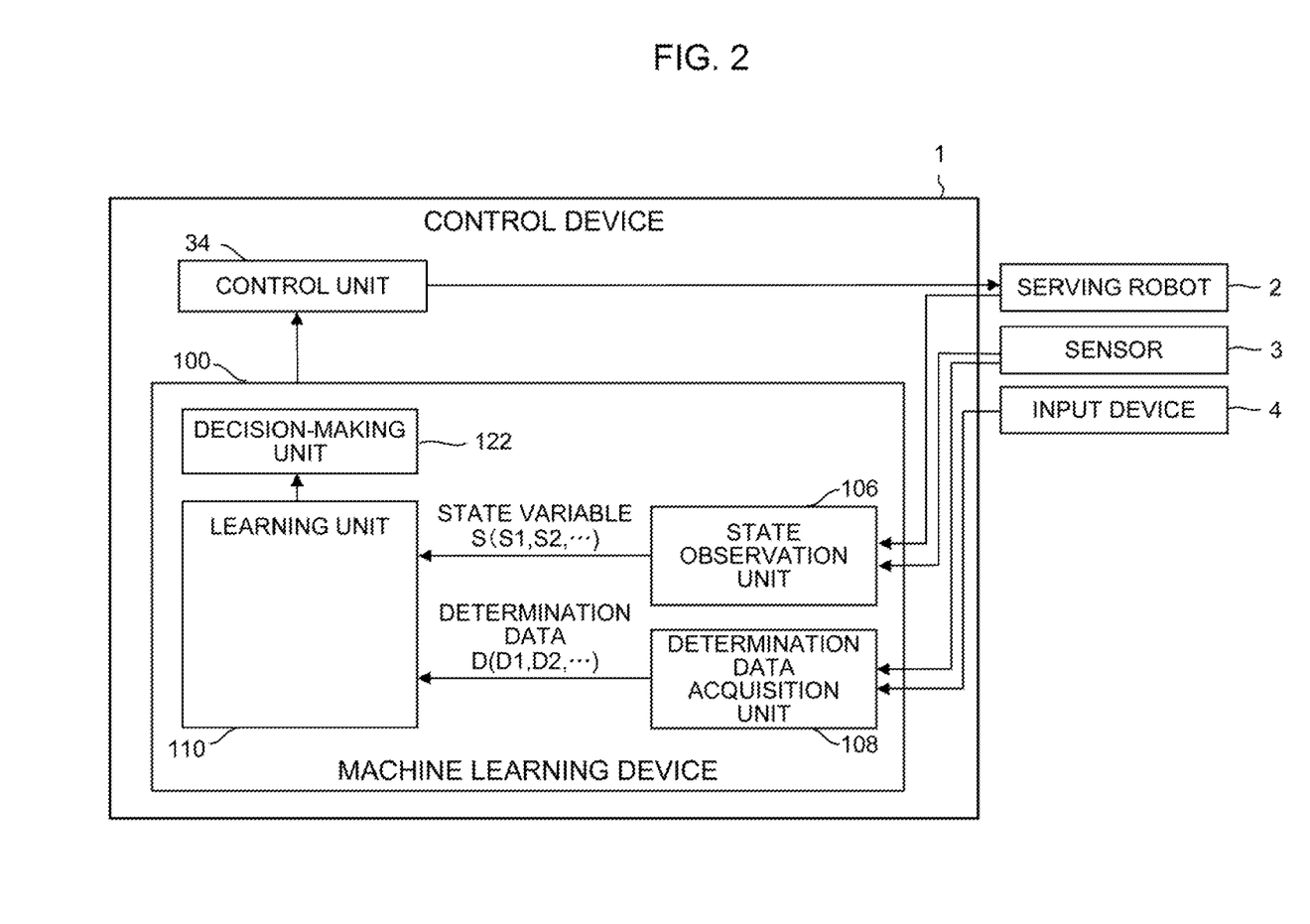
FIG. 2 is a functional block diagram schematically illustrating the control device according to the first embodiment.

FIG. 2 is a functional block diagram schematically illustrating the control device 1 and the machine learning device 100 according to the first embodiment. Functional blocks illustrated in FIG. 2 are realized when the CPU 11 included in the control device 1 and the processor 101 of the machine learning device 100 which are illustrated in FIG. 1 execute respective system programs and respectively control an operation of each unit of the control device 1 and the machine learning device 100.

The control device 1 according to the present embodiment includes a control unit 34 that controls the serving robot 2 based on a component arrangement on a component serving place outputted from the machine learning device 100. The control unit 34 generally controls an operation of the serving robot 2 in accordance with a component serving command for the serving robot 2 instructed by a program or the like. However, if a component arrangement on a component serving place is outputted from the machine learning device 100, the control unit 34 controls the serving robot 2 so that the component arrangement on a component serving place instructed by the program or the like is exchanged for the component arrangement on a component serving place outputted from the machine learning device 100.

Meanwhile, the machine learning device 100 included in the control device 1 includes software (a learning algorithm, for example) and hardware (the processor 101, for example) by which the machine learning device 100 itself learns a component arrangement on a component serving place with respect to information of components used for assembling a product and status information of an operator, through so-called machine learning. What the machine learning device 100 included in the control device 1 learns corresponds to a model structure representing a correlation of information of components used for assembling a product and status information of an operator with respect to a component arrangement on a component serving place.

As illustrated in the functional block of FIG. 2, the machine learning device 100 included in the control device 1 includes a state observation unit 106, a determination data acquisition unit 108, and a learning unit 110. The state observation unit 106 observes component arrangement data S1 representing a component arrangement on a component serving place, component data S2 representing information of components used for assembling a product, and operator status data S3 representing status information of an operator as state variables S representing a current state of an environment. The determination data acquisition unit 108 acquires determination data D including product quality determination data D1 for determining quality of a product which is assembled by an operator based on a determined component arrangement on a component serving place and takt time determination data D2 for determining takt time for an assembly work by an operator. The learning unit 110 performs learning based on the state variables S and the determination data D in a manner to associate information of components used for assembling a product and status information of an operator with respect to a component arrangement on a component serving place.

Among the state variables S observed by the state observation unit 106, the component arrangement data S1 can be acquired as a component arrangement on a component serving place. The component arrangement on a component serving place can be acquired from a component serving command issued with respect to the serving robot 2, for example. Alternatively, the component arrangement on a component serving place can be acquired by analyzing an image of a component serving place acquired from the sensor 3.

Figure 3:
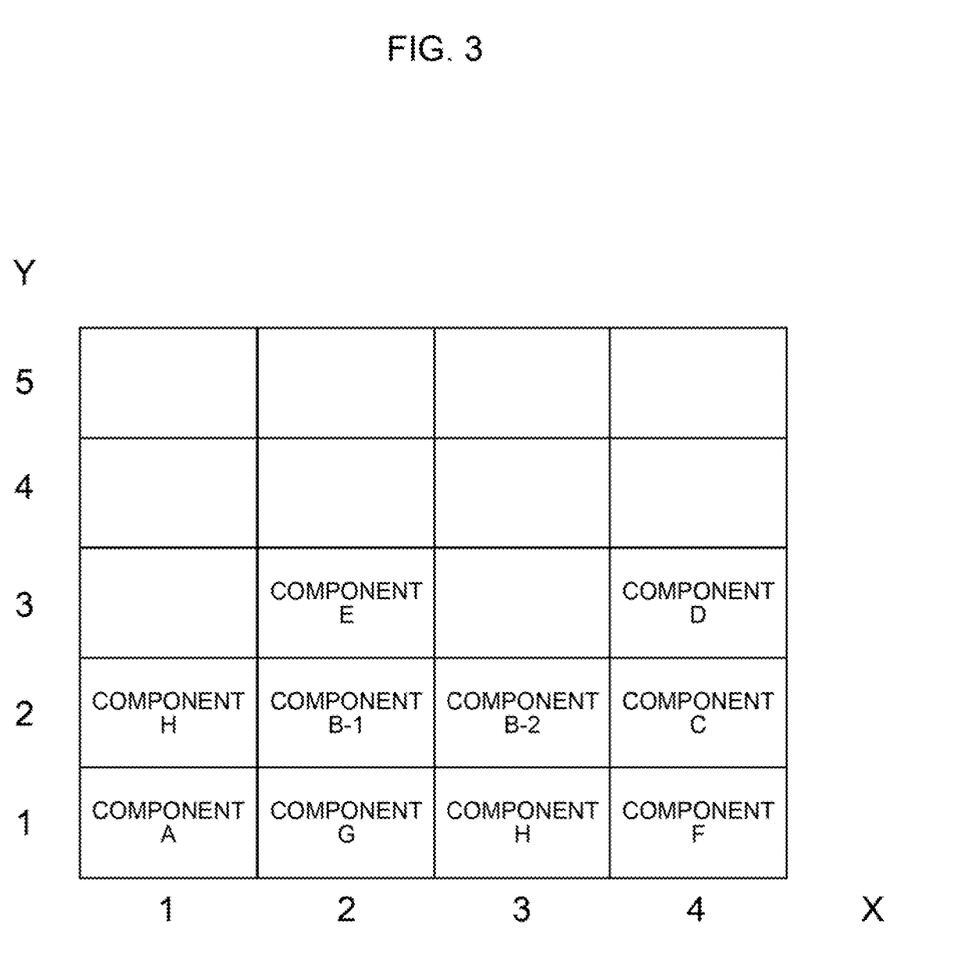
FIG. 3 illustrates an example of component arrangement data S1.

The component arrangement data S1 can be defined as an array of positions of components on a component serving place, for example. FIG. 3 illustrates an example of the component arrangement data S1. In the example of FIG. 3, a component serving place is divided into a plurality of partial areas, components which are to be disposed in respective partial areas are set, and then the partial areas are defined as two-dimensional array data so as to convert a component arrangement on a component serving place into data. Each component is managed in a manner to be provided with an identification number by which the component can be uniquely identified. A large component which extends over a plurality of partial areas may be denoted by providing a serial number after the identification number thereof such as component B-1 and component B-2.

As the component arrangement data S1, a component arrangement on a component serving place can be directly used, the component arrangement determined by the machine learning device 100 in the last learning cycle with respect to information of components used for assembling a product and status information of an operator of the last learning cycle, based on a learning result of the learning unit 110. When such a method is employed, the machine learning device 100 may temporarily store a component arrangement on a component serving place in the RAM 103 every learning cycle and the state observation unit 106 may acquire a component arrangement on a component serving place of the last learning cycle from the RAM 103 as the component arrangement data S1 of a current learning cycle.

Among the state variables S observed by the state observation unit 106, the component data S2 can be acquired as array data including a shape, a dimension, a weight, and a using order in assembly of each of components to be arranged on a component serving place. These contents of the array data are acquired from a program used for controlling the serving robot 2 or inputted from the input device 4. Each of the components used for assembling a product is managed in a manner to be provided with an identification number, by which the component can be uniquely identified.

Among the state variables S observed by the state observation unit 106, the operator status data S3 can be acquired as status information of an operator. The status information of an operator can be used as data in which pieces of information such as age of an operator, a dominant hand of the operator, physical size of the operator, proficiency of the operator, and sex of the operator are arrayed. Further, a fatigue level of an operator (which may be measured by attaching a sensor to the operator or for which time elapsed from the start of an operation may be substituted) may be used as the status information of an operator as appropriate. For each of these pieces of information, one numerical value may be labeled to a predetermined range and the numerical value may be handled as input data. Physical size of an operator may be handled in a manner to be quantified such as 1 for the height of 140 cm or more but less than 160 cm, 2 for the height of 160 cm or more but less than 170 cm, and 3 for the height of 170 cm or more, for example.

The determination data acquisition unit 108 may use a determination result on quality of a product which is assembled by an operator based on a determined component arrangement on a component serving place, as the product quality determination data D1. The product quality determination data D1 used by the determination data acquisition unit 108 may be a result determined in accordance with an arbitrarily-set criterion such as whether a product which is actually assembled by an operator based on a determined component arrangement on a component serving place is a non-defective product (suitable) or a defective product (unsuitable). Examples of the criterion include displacement in fitting of a component, mistake in fitting of a component, oblivion of screwing, and loss of a component.

Further, the determination data acquisition unit 108 can use a determination result of takt time for an assembly work performed by an operator based on a determined component arrangement on a component serving place, as the takt time determination data D2. The takt time determination data D2 used by the determination data acquisition unit 108 may be a result determined in accordance with an arbitrarily-set criterion such as whether time taken for actually assembling a product by an operator based on a determined component arrangement on a component serving place is shorter (suitable) or longer (unsuitable) than a prescribed threshold value which is set in advance.

Here, though the determination data acquisition unit 108 is an essential unit at the stage of learning by the learning unit 110, the determination data acquisition unit 108 is not necessarily an essential unit after the learning unit 110 completes learning in which information of components used for assembling a product and status information of an operator are associated with a component arrangement on a component serving place. When the machine learning device 100 in which learning is completed is shipped out to a client, for example, the machine learning device 100 may be shipped out in a state that the determination data acquisition unit 108 is detached.

State variables S which are simultaneously inputted into the learning unit 110 are based on data of the last learning cycle in which the determination data D is acquired, when considered based on a learning cycle by the learning unit 110. Thus, while the machine learning device 100 included in the control device 1 advances learning, acquisition of the component data S2 and the operator status data S3, serving of components by the serving robot 2 based on the component arrangement data S1 determined based on each acquired data, and acquisition of the determination data D are repeatedly performed in an environment.

The learning unit 110 learns a component arrangement on a component serving place with respect to information of components used for assembling a product and status information of an operator in accordance with arbitrary learning algorithms collectively called machine learning. The learning unit 110 is capable of repeatedly executing learning based on a data set including the state variables S and the determination data D which are described above. During the repetition of a learning cycle for a component arrangement on a component serving place with respect to information of components used for assembling a product and status information of an operator, the state variables S are acquired from information of components used for assembling a product and status information of an operator of the last learning cycle and a component arrangement on a component serving place which is determined in the last learning cycle as described above, and the determination data D is set as a suitability determination result on quality of a product which is assembled by an operator based on the determined component arrangement on a component serving place.

Through repetition of such a learning cycle, the learning unit 110 comes to be able to identify a feature indicating a correlation of information of components used for assembling a product and status information of an operator with respect to a component arrangement on a component serving place. Though the correlation of information of components used for assembling a product and status information of an operator with respect to a component arrangement on a component serving place is substantially unknown at the start of the learning algorithm, the learning unit 110 gradually identifies features as the learning unit 110 advances the learning and thus interprets the correlation. When the correlation of information of components used for assembling a product and status information of an operator with respect to a component arrangement on a component serving place is interpreted to some reliable level, a learning result which is repeatedly outputted by the learning unit 110 goes to a usable level for performing selection (that is, decision-making) of an action for determining a component arrangement on a component serving place with respect to a current state (that is, information of components used for assembling a product and status information of an operator). That is, the learning unit 110 is capable of gradually bringing the correlation of information of components used for assembling a product and status information of an operator with respect to a component arrangement on a component serving place, that is, an action for setting a component arrangement on a component serving place with respect to information of components used for assembling a product and status information of an operator, to an optimal solution along with advancement of the learning algorithm.

A decision-making unit 122 determines a component arrangement on a component serving place based on a result obtained through learning by the learning unit 110 and outputs the determined component arrangement on a component serving place to the control unit 34. When information of components used for assembling a product and status information of an operator are inputted into the machine learning device 100 in a state that the learning by the learning unit 110 is completed, the decision-making unit 122 outputs a component arrangement on a component serving place. The decision-making unit 122 determines an appropriate component arrangement on a component serving place based on the state variables S and the result obtained through the learning by the learning unit 110.

In the machine learning device 100 included in the control device 1, the learning unit 110 learns a component arrangement on a component serving place with respect to information of components used for assembling a product and status information of an operator in accordance with a machine learning algorithm by using the state variables S observed by the state observation unit 106 and the determination data D acquired by the determination data acquisition unit 108, as described above. The state variables S are data that are the component arrangement data S1, the component data S2, and the operator status data S3, and the determination data D can be uniquely obtained by analyzing information acquired from the serving robot 2 by the control device 1. Thus, according to the machine learning device 100 included in the control device 1, it is possible to automatically and accurately perform component arrangement on a component serving place, which corresponds to information of components used for assembling a product and status information of an operator, by using a learning result of the learning unit 110.

If a component arrangement on a component serving place can be automatically determined, an appropriate value of a component arrangement on a component serving place can be rapidly determined only by grasping information of components used for assembling a product (the component data S2) and status information of an operator (the operator status data S3). Thus, a component arrangement on a component serving place can be efficiently determined.

As a modification of the machine learning device 100 included in the control device 1 according to the present embodiment, the determination data acquisition unit 108 may further acquire operator motion determination data D3 representing a motion of an operator as well as the product quality determination data D1 and the takt time determination data D2 as the determination data D. The operator motion determination data D3 may be a result which is determined in accordance with an arbitrarily-set criterion such as whether an operator takes an unnatural posture (unsuitable) when he/she picks up a component, based on a motion (detected by the sensor 3, for example, as an imaging device) of the operator acquired while the operator is performing an assembly work of a product. At this time, it is preferable to acquire data on a picked-up component corresponding to a motion, as one of the determination data.

According to the above-described modification, the machine learning device 100 is capable of causing the learning unit 110 to learn so as to avoid a component arrangement which forces an operator to take an unnatural posture, by giving low evaluation by using the operator motion determination data D3 with respect to such a component arrangement. In the case where the machine learning device 100 grasps that an operator takes an unnatural posture when he/she picks up a specific component, the machine learning device 100 proposes a component arrangement in which a position of this component is changed in the following learning cycle, for example. Thus, the machine learning device 100 preferentially tries local change of a component arrangement, being expected to advance an efficient learning process.

Figure 4:
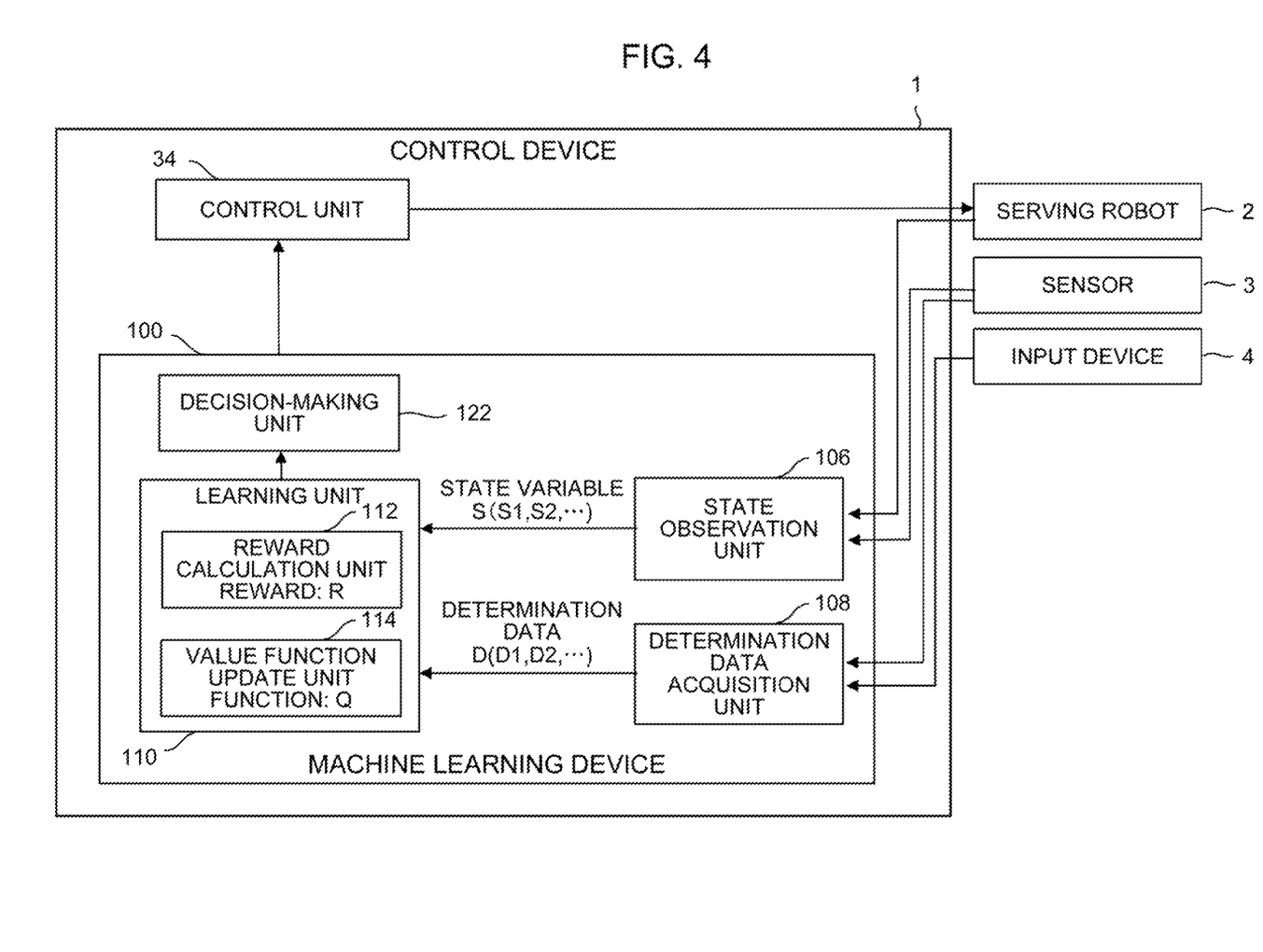
FIG. 4 is a functional block diagram schematically illustrating an aspect of the control device.

In the machine learning device 100 having the above-described configuration, a learning algorithm executed by the learning unit 110 is not especially limited but a known learning algorithm can be employed as machine learning. FIG. 4 illustrates an aspect of the control device 1 illustrated in FIG. 2, which has the configuration including the learning unit 110 that executes reinforcement learning as an example of the learning algorithm. The reinforcement learning is a method in which a cycle, in which a predetermined action (that is, an output) is executed in a current state of an environment in which a learning object exists while observing the current state (that is, an input) and some reward is imparted with respect to the action, is repeated through trial and error so as to learn measures, by which a total reward is maximized, (a component arrangement on a component serving place in the machine learning device in the present application) as an optimal solution.

In the machine learning device 100 included in the control device 1 illustrated in FIG. 4, the learning unit 110 includes a reward calculation unit 112 and a value function update unit 114. The reward calculation unit 112 obtains reward R related to a suitability determination result (corresponding to the determination data D used in the following learning cycle of a cycle in which the state variables S are acquired) of assembly of a product by an operator when a component arrangement on a component serving place is determined based on the state variables S and components are arranged by the serving robot 2 based on the determined component arrangement on a component serving place. The value function update unit 114 updates function Q representing a value of a component arrangement on a component serving place, by using the reward R. The learning unit 110 learns a component arrangement on a component serving place with respect to information of components used for assembling a product and status information of an operator, through repeated update of the function Q performed by the value function update unit 114.

An example of an algorithm of the reinforcement learning executed by the learning unit 110 is described. The algorithm in this example is known as Q-learning and is a method for learning the function Q(s,a) representing a value of an action in the case where an action a is selected in a state s when the state s of an action subject and the action a which can be selected by the action subject in the state s are set as independent variables. To select the action a to which the value function Q reaches the highest in the state s is an optimal solution. The Q-learning is started in a state in which a correlation between the state s and the action a is unknown and trial and error are repeated in selection of various actions a in an arbitrary state s. Thus, the value function Q is repeatedly updated so as to be approximated to the optimal solution. Here, the configuration is employed in which when an environment (that is, the state s) is changed as a result of selection of the action a in the state s, reward r (that is, weighting of the action a) corresponding to the change can be obtained, and the learning is guided so as to select the action a by which higher reward r can be obtained. Thus, the value function Q can be approximated to the optimal solution in a relatively short period of time.

An update formula of the value function Q can be generally expressed as Formula 1 below. In Formula 1, $s_t$ and $a_t$ respectively denote a state and an action at time t and the state is changed to $s_{t+1}$ depending on the action $a_t$. $r_{t+1}$ denotes reward which is obtained when the state is changed from $s_t$ to $s_{t+1}$. A term of maxQ denotes Q obtained when the action a, in which the maximum value Q is obtained at time t+1 (it is considered that the maximum value Q is obtained at time t+1, at time t), is performed. $\alpha$ and $\gamma$ respectively denote a learning coefficient and a discount rate and are arbitrarily set as $0<\alpha\leq1$ and $0<\gamma\leq1$.

$$Q(s_t, a_t) \leftarrow Q(s_t, a_t) + \alpha\left(r_{t+1} + \gamma \max_a Q(s_{t+1}, a) - Q(s_t, a_t)\right) \quad \text{[Formula 1]}$$

When the learning unit 110 executes the Q-learning, the state variable S observed by the state observation unit 106 and the determination data D acquired by the determination data acquisition unit 108 correspond to the state s in an update formula, the way to determine a component arrangement on a component serving place with respect to a current state (that is, information of components used for assembling a product and status information of an operator) corresponds to the action a in the update formula, and the reward R obtained by the reward calculation unit 112 corresponds to the reward r in the update formula. Accordingly, the value function update unit 114 repeatedly updates the function Q representing a value of a component arrangement on a component serving place corresponding to a current state by the Q-learning using the reward R.

In the case where after determination of a component arrangement on a component serving place, a suitability determination result with respect to assembly of a product assembled by an operator based on the determined component arrangement on a component serving place is "suitable" (such as the case where quality of the product assembled by the operator is good and the case where takt time for an assembly work by the operator is shorter than a predetermined threshold value or tack time in the last learning cycle, for example), the reward R obtained by the reward calculation unit 112 may be set as positive (plus) reward R. In the case where after determination of a component arrangement on a component serving place, a suitability determination result with respect to assembly of a product by an operator based on the determined component arrangement on a component serving place is "unsuitable" (such as the case where quality of the product assembled by the operator is poor and the case where takt time for an assembly work by the operator is longer than a predetermined threshold value or tack time in the last learning cycle, for example), the reward R obtained by the reward calculation unit 112 may be set as negative (minus) reward R. Absolute values of the positive and negative rewards R may be identical to each other or different from each other. As for a condition of the determination, the determination may be performed based on a combination of a plurality of values included in the determination data D.

Further, a suitability determination result for assembly of a product by an operator based on a set component arrangement on a component serving place may be set not only in two ways which are "suitable" and "unsuitable" but also in multiple stages. As an example, when a threshold value of takt time for an assembly work by an operator is $T_{max}$, the configuration may be employed in which reward R=5 is imparted when takt time T for an assembly work by an operator is $0 \leq T < T_{max}/5$, reward R=3 is imparted when the takt time T is $T_{max}/5 \leq T < T_{max}/2$, reward R=1 is imparted when the takt time T is $T_{max}/2 \leq T < T_{max}$, and reward R=−3 (minus reward) is imparted when the takt time T is $T_{max} \leq T$.

Further, the configuration may be employed in which a threshold value used for determination is set relatively large in the initial stages of the learning and the threshold value is reduced along with advancement of the learning.

The value function update unit 114 can have an action value table in which the state variables S, the determination data D, and the rewards R are organized while being associated with action values (for example, numeral values) expressed by the function Q. In this case, an action for updating the function Q by the value function update unit 114 is synonymous with an action for updating the action value table by the value function update unit 114. Since the correlation between a current state of an environment and a component arrangement on a component serving place is unknown at the start of the Q-learning, various state variables S, determination data D, and rewards R are prepared in a manner to be associated with values of action values (functions Q) defined on a random basis in the action value table. The reward calculation unit 112 is capable of calculating the reward R corresponding to determination data D as soon as the reward calculation unit 112 figures out the determination data D, and the calculated value R is written in the action value table.

As the Q-learning is advanced by using the reward R corresponding to a suitability determination result of an operation of the serving robot 2, the learning is guided to select an action for which higher reward R can be obtained, and a value of an action value (function Q) for an action performed in a current state is rewritten in accordance with a state of an environment (that is, the state variable S and the determination data D) which is changed as a result of execution of the selected action in the current state. Thus, the action value table is updated. By repeating this update, the value of the action value (function Q) displayed on the action value table is rewritten to be a larger value as an action is more appropriate (an action of determining a component arrangement on a component serving place so as to avoid an occurrence of a problem in assembly of a product by an operator, in the present invention). Thus, a correlation between a current state of an environment which has been unknown (information of components used for assembling a product and status information of an operator) and a corresponding action (a component arrangement on a component serving place) gradually becomes apparent. That is, a relation of information of components used for assembling a product and status information of an operator with respect to a component arrangement on a component serving place is gradually approximated to an optimal solution through update of the action value table.

Figure 5:
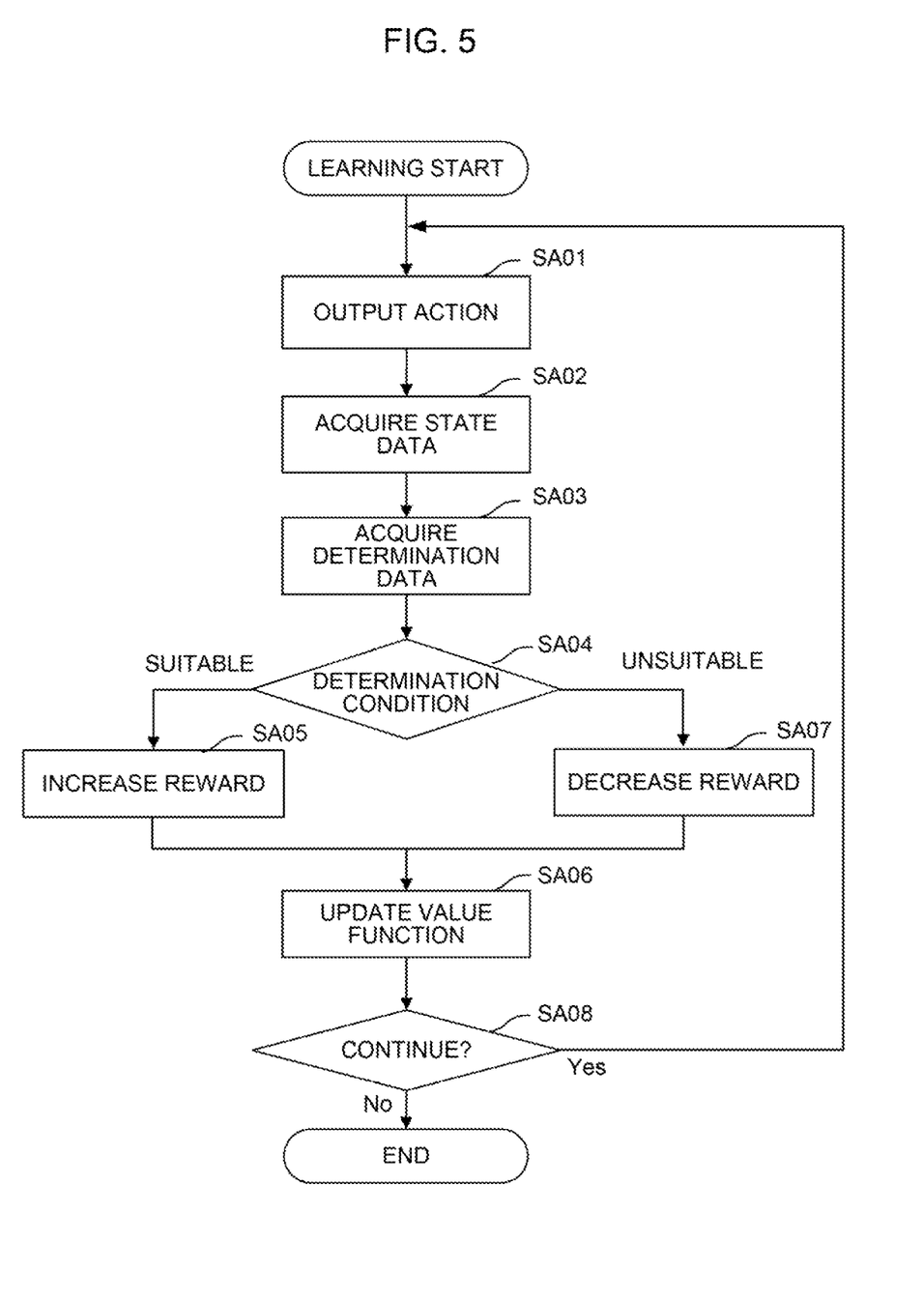
FIG. 5 is a flowchart schematically illustrating an aspect of a machine learning method.

A flow of the above-described Q-learning executed by the learning unit 110 (that is, an aspect of the machine learning method) is further described in reference to FIG. 5. First, in step SA01, the value function update unit 114 selects a component arrangement on a component serving place at random as an action, which is performed in a current state represented by the state variable S observed by the state observation unit 106, while referring to the action value table at that time. Then, the value function update unit 114 takes in the state variable S of the current state observed by the state observation unit 106 in step SA02 and takes in the determination data D of the current state acquired by the determination data acquisition unit 108 in step SA03. Subsequently, the value function update unit 114 determines whether or not the component arrangement on a component serving place is suitable, based on the determination data D in step SA04. When the component arrangement on a component serving place is suitable, positive reward R obtained by the reward calculation unit 112 is applied to an update formula of the function Q in step SA05 and then, the action value table is updated by using the state variable S, the determination data D, the reward R, and the value of the action value (the function Q after update) in the current state in step SA06. When it is determined that the component arrangement on a component serving place is not suitable in step SA04, negative reward R obtained by the reward calculation unit 112 is applied to the update formula of the function Q in step SA07 and then, the action value table is updated by using the state variable S, the determination data D, the reward R, and the value of the action value (the function Q after update) in the current state in step SA06. The learning unit 110 repeatedly updates the action value table by repeating steps SA01 to SA07 so as to advance the learning of a component arrangement on a component serving place. Here, the processing for obtaining the reward R and the processing for updating the value function performed from step SA04 to step SA07 are executed for each data included in the determination data D.

Figure 6A:
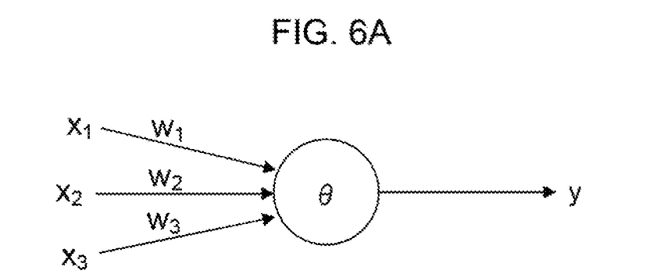
FIG. 6A illustrates a neuron.
Figure 6B:
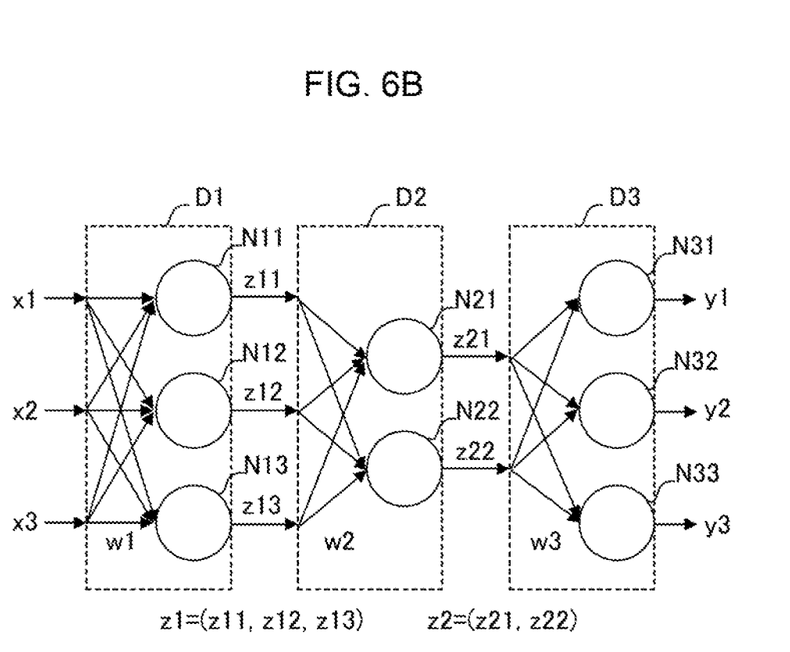
FIG. 6B illustrates a neural network.

When the above-described reinforcement learning is advanced, a neural network, for example, is applicable. FIG. 6A schematically illustrates a model of a neuron. FIG. 6B schematically illustrates a model of a three-layered neural network which is configured by combining the neurons illustrated in FIG. 6A. The neural network can be composed of arithmetic devices, storage devices, or the like, for example, in imitation of the model of neurons.

The neuron illustrated in FIG. 6A outputs a result y with respect to a plurality of inputs x (input $x_1$ to input $x_3$ as an example here). Inputs $x_1$ to $x_3$ are respectively multiplied by weights w ($w_1$ to $w_3$) corresponding to these inputs x. Accordingly, the neuron outputs the output y expressed by Formula 2 below. Here, in Formula 2, all of input x, output y, and weight w are vectors. Further, θ denotes a bias and $f_k$ denotes an activation function.

$$y = f_k(\Sigma_{i=1}^{n} x_i w_i - \theta) \quad \text{[Formula 2]}$$

In the three-layered neural network illustrated in FIG. 6B, a plurality of inputs x (input x1 to input x3 as an example here) are inputted from the left side and results y (result y1 to result y3 as an example here) are outputted from the right side. In the example illustrated in FIG. 6B, inputs x1, x2, x3 are each multiplied by corresponding weights (collectively denoted by w1) and each of inputs x1, x2, x3 is inputted into three neurons N11, N12, N13.

In FIG. 6B, an output of each of the neurons N11, N12, N13 is collectively denoted by z1. z1 can be considered as a feature vector obtained by extracting a feature amount of an input vector. In the example illustrated in FIG. 6B, feature vectors z1 are each multiplied by corresponding weights (collectively denoted by w2) and each of feature vectors z1 is inputted into two neurons N21, N22. Feature vector z1 represents a feature between weight w1 and weight w2.

In FIG. 6B, an output of each of the neurons N21, N22 is collectively denoted by z2. z2 can be considered as a feature vector obtained by extracting a feature amount of feature vector z1. In the example illustrated in FIG. 6B, feature vectors z2 are each multiplied by corresponding weights (collectively denoted by w3) and each of feature vectors z2 is inputted into three neurons N31, N32, N33. Feature vector z2 represents a feature between weight w2 and weight w3. Finally, neurons N31 to N33 respectively output results y1 to y3.

Here, the method of so-called deep learning in which a neural network having three or more layers is used may be employed as well.

In the machine learning device 100 included in the control device 1, the learning unit 110 performs calculation of the multilayer structure following the above-described neural network by using the state variable S and the action a as inputs x in the neural network used as a value function in the Q-learning, being able to output a value (results y) of the action in this state. Here, operation modes of the neural network include a learning mode and a value prediction mode. For example, weight w can be learned by using a learning data set in the learning mode and value determination of an action can be performed by using the learned weight w in the value prediction mode. Here, detection, classification, inference, and the like can also be performed in the value prediction mode.

The above-described configuration of the control device 1 can be described as a machine learning method (or software) executed by the processor 101. This machine learning method is a machine learning method for learning a component arrangement on a component serving place. The machine learning method includes: a step for observing the component arrangement data S1, the component data S2, and the operator status data S3 as the state variables S representing a current state of an environment in which the serving robot 2 operates; a step for acquiring the determination data D representing a suitability determination result on assembly of a product assembled by an operator based on the determined component arrangement on a component serving place; and a step for learning the component data S2, the operator status data S3, and the component arrangement on a component serving place while associating the component data S2 and the operator status data S3 with the component arrangement on a component serving place by using the state variables S and the determination data D. In this method, the steps are performed by a CPU of a computer.

Figure 7:
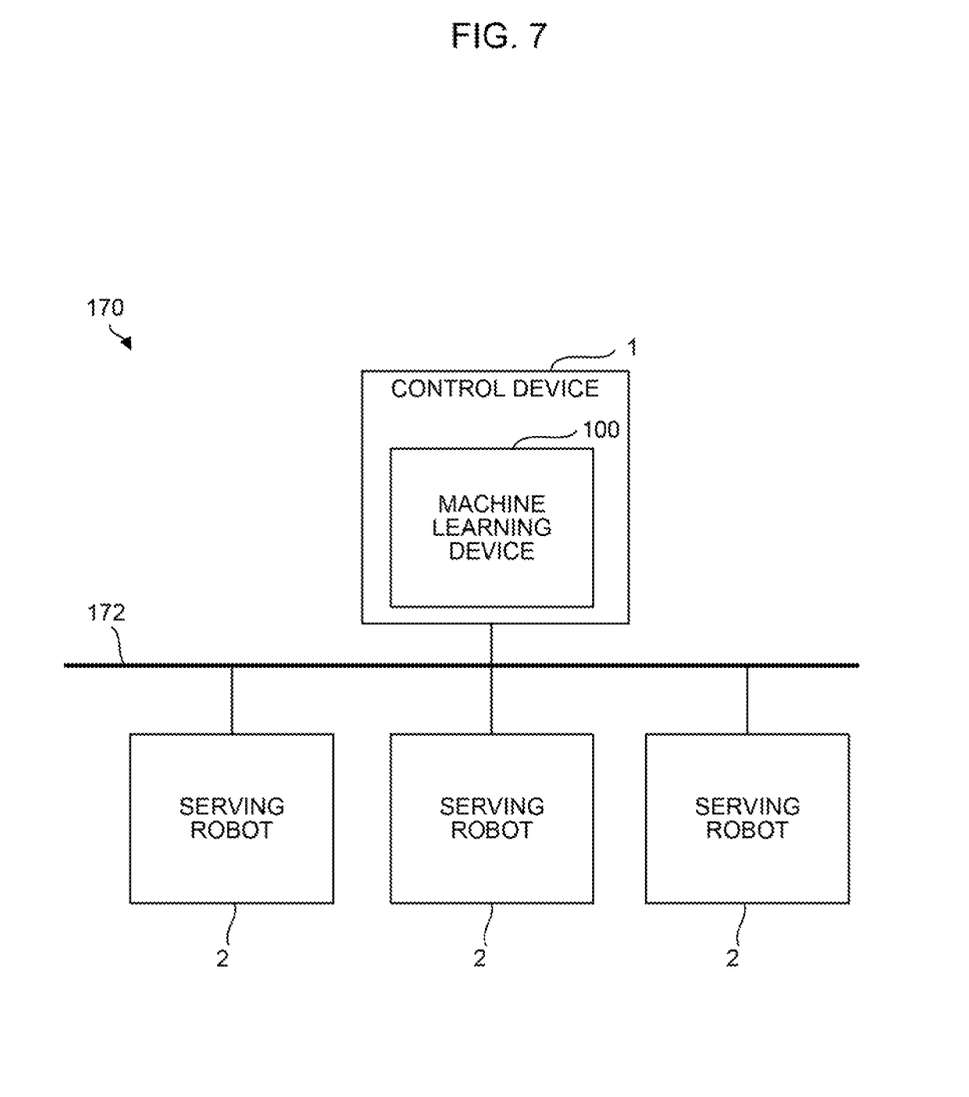
FIG. 7 is a functional block diagram schematically illustrating an aspect of a system in which the control device is incorporated.

FIG. 7 illustrates a system 170 according to a third embodiment including the control device 1. The system 170 includes at least one control device 1, which is mounted as a part of a computer such as a cell computer, a host computer, and a cloud server, a plurality of serving robots 2 which are control objects, and a wired/wireless network 172 which connects the control device 1 and the serving robots 2 with each other.

In the system 170 having the above-described configuration, the control device 1 including the machine learning device 100 is capable of automatically and accurately obtaining a component arrangement on a component serving place with respect to information of components used for assembling a product and status information of an operator by using a learning result of the learning unit 110 for each of the serving robots 2. Further, the system 170 may be configured so that the machine learning device 100 of the control device 1 learns a component arrangement on a component serving place common to all of the serving robots 2 based on the state variables S and the determination data D, which are obtained for each of the serving robots 2, and the learning result is shared in operations of all the serving robots 2. According to the system 170, speed and reliability in learning of a component arrangement on a component serving place can be improved by using more various data sets (including the state variables S and the determination data D) as inputs.

The embodiments of the present invention have been described above, but the present invention can be embodied in various aspects by adding arbitrary alterations, without being limited only to the examples of the above-described embodiments.

For instance, the learning algorithm and the calculation algorithm executed by the machine learning device 100 and the control algorithm executed by the control device 1, for example, are not limited to the above-mentioned algorithms, but various algorithms may be employed.

The above-described embodiments include the description that the control device 1 and the machine learning device 100 are devices including CPUs different from each other, but the machine learning device 100 may be realized by the CPU 11 included in the control device 1 and the system program stored in the ROM 12.

Further, description is provided based on the example in which an operator assembles components, which are arranged on a component serving place, as a product in the above-described embodiments, but the operator assembling a product may be an assembly robot. In this case, a kind of a robot, for example, may be used as an operator status. Regarding the assembly robot serving as an operator, power consumption data D3 is used as determination data acquired by the determination data acquisition unit 108, being able to realize the machine learning device 100 which learns a component arrangement which reduces power consumption.

The embodiments of the present invention have been described above, but the present invention can be embodied in another aspect by adding arbitrary alterations, without being limited to the examples of the above-described embodiments.

The invention claimed is:

1. A control device that instructs an arrangement of components on a component serving place, the arrangement being performed by a serving robot, the control device comprising:
a processor that learns a component arrangement on the component serving place by the serving robot, wherein the processor is configured to:
observe component arrangement data acquired from a component serving command issued with respect to the serving robot or acquired by analyzing an image of a component serving place acquired from a sensor representing an arrangement of the components on the component serving place, component data acquired from the serving robot or input through an input device representing information of the components, and operator status data representing status information of an operator who assembles a product with the components, as state variables representing a current state of an environment,
acquire product quality determination data for determining quality of the product which is assembled based on an arrangement of the components in accordance with a criterion including one of displacement in fitting of a component, mistake in fitting of a component, oblivion of screwing, and loss of a component and takt time determination data for determining takt time for assembly of the product as determination data representing assembly performance of the product by the operator, and
learn based on the state variables and the determination data in a manner to associate information of the components used for assembling the product and status information of the operator with respect to an arrangement of the components on the component serving place.

2. The control device according to claim 1, wherein the processor is further configured to:
obtain a reward related to the suitability determination result,
update a function representing a value of an arrangement of the components on the component serving place with respect to information of the components used for assembling the product and status information of the operator, by using the reward, and
impart a higher reward as quality of the product is higher and the takt time is shorter.

3. The control device according to claim 1, wherein the processor is further configured to calculate the state variables and the determination data in a multilayer structure.

4. A control device that instructs an arrangement of components on a component serving place, the arrangement being performed by a serving robot, the control device comprising:
a processor that has learned a component arrangement on the component serving place by the serving robot, wherein the processor is configured to:
observe component arrangement data acquired from a component serving command issued with respect to the serving robot or acquired by analyzing an image of a component serving place acquired from a sensor representing an arrangement of the components on the component serving place, component data acquired from the serving robot or input through an input device representing information of the components, and operator status data representing status information of an operator who assembles a product with the components, as state variables representing a current state of an environment,
perform learning in a manner to associate information of the components used for assembling the product and status information of the operator with respect to an arrangement of the components on the component serving place, and
determine an arrangement of the components on the component serving place based on state variables observed and a learning result obtained.

5. The control device according to claim 1, wherein the machine learning device exists in a cloud server.

6. A machine learning device that learns an arrangement of components on a component serving place, the arrangement being performed by a serving robot, the machine learning device comprising:
a processor configured to:
observe component arrangement data acquired from a component serving command issued with respect to the serving robot or acquired by analyzing an image of a component serving place acquired from a sensor representing an arrangement of the components on the component serving place, component data acquired from the serving robot or input through an input device representing information of the components, and operator status data representing status information of an operator who assembles a product with the components, as state variables representing a current state of an environment;

acquire product quality determination data for determining quality of the product which is assembled based on an arrangement of the components in accordance with a criterion including one of displacement in fitting of a component, mistake in fitting of a component, oblivion of screwing, and loss of a component and takt time determination data for determining takt time for assembly of the product as determination data representing assembly performance of the product by the operator; and learn based on the state variables and the determination data in a manner to associate information of the components used for assembling the product and status information of the operator with respect to an arrangement of the components on the component serving place.

7. A machine learning device that has learned an arrangement of components on a component serving place, the arrangement being performed by a serving robot, the machine learning device comprising:
a processor configured to:
observe component arrangement data acquired from a component serving command issued with respect to the serving robot or acquired by analyzing an image of a component serving place acquired from a sensor representing an arrangement of the components on the component serving place, component data acquired from the serving robot or input through an input device representing information of the components, and operator status data representing status information of an operator who assembles a product with the components, as state variables representing a current state of an environment;

perform learning in a manner to associate information of the components used for assembling the product and status information of the operator with respect to an arrangement of the components on the component serving place; and determine an arrangement of the components on the component serving place based on state variables observed and a learning result obtained.

* * * * *